(12) United States Patent
Criscione et al.

(10) Patent No.: US 11,870,798 B2
(45) Date of Patent: Jan. 9, 2024

(54) MINIMIZING SECURITY SCANNING INDUCED NETWORK DISRUPTIONS

(71) Applicant: Google LLC, Mountain View, CA (US)

(72) Inventors: Claudio Criscione, Zurich (CH); David Aslanian, Palo Alto, CA (US); Sebastian Lekies, Zurich (CH); Joseph Nelson, Fremont, CA (US)

(73) Assignee: Google LLC, Mountain View, CA (US)

(*) Notice: Subject to any disclaimer, the term of this patent is extended or adjusted under 35 U.S.C. 154(b) by 351 days.

(21) Appl. No.: 17/238,361

(22) Filed: Apr. 23, 2021

(65) Prior Publication Data
US 2022/0345478 A1 Oct. 27, 2022

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC .......... H04L 63/1433; H04L 63/1425
See application file for complete search history.

(56) References Cited

U.S. PATENT DOCUMENTS

| | | | | |
|---|---|---|---|---|
| 2012/0144494 | A1* | 6/2012 | Cole | G02B 6/12011 726/25 |
| 2013/0167238 | A1* | 6/2013 | Russell | G06F 21/577 726/25 |
| 2013/0269028 | A1* | 10/2013 | Nakawatase | H04L 63/1433 726/22 |
| 2017/0300694 | A1* | 10/2017 | Kuan | G06F 21/54 |
| 2018/0351999 | A1* | 12/2018 | Barday | H04L 63/20 |
| 2021/0200899 | A1* | 7/2021 | Brannon | G06F 11/3065 |
| 2022/0255805 | A1* | 8/2022 | Hausermann | G06N 20/00 |
| 2022/0263852 | A1* | 8/2022 | Crabtree | G06N 5/045 |
| 2022/0269776 | A1* | 8/2022 | Nalluri | G06F 21/577 |
| 2022/0269817 | A1* | 8/2022 | Nalluri | G06F 21/577 |
| 2022/0272115 | A1* | 8/2022 | McParland | G06N 5/04 |
| 2022/0272117 | A1* | 8/2022 | Maheve | H04L 63/1416 |
| 2022/0277078 | A1* | 9/2022 | Tyagi | G06F 21/554 |
| 2022/0286474 | A1* | 9/2022 | Kuppa | G06F 21/552 |

(Continued)

*Primary Examiner* — Stephen T Gundry
(74) *Attorney, Agent, or Firm* — Honigman LLP; Brett A. Krueger

(57) ABSTRACT

A method for minimizing scan disruptions includes receiving a scan request requesting to scan a set of network-connected assets. Each network-connected asset is associated with corresponding network characteristics. The method includes partitioning the set of network-connected assets into a plurality of groups based on the corresponding network characteristics. For each respective group, simultaneously, the method includes determining an ordered list for scanning each network-connected asset in the respective group, scanning a first network-connected asset of the respective group based on the ordered list, and, after scanning the first network-connected asset, determining a post-scan health status of the first network-connected asset. The method includes determining, using the post-scan health status, that a health of the first network-connected asset is degraded. The method also includes, in response to determining that the health of the first network-connected asset is degraded, halting scanning of further network-connected assets in the respective group.

20 Claims, 8 Drawing Sheets

Groups each with a Subset of Network Connected Assets

(56) References Cited

U.S. PATENT DOCUMENTS

| | | | |
|---|---|---|---|
| 2022/0311740 A1* | 9/2022 | Gautam | H04L 63/029 |
| 2022/0321540 A1* | 10/2022 | Loman | H04L 63/20 |
| 2022/0337555 A1* | 10/2022 | Gol | H04L 63/029 |
| 2022/0345457 A1* | 10/2022 | Jeffords | G06F 21/6218 |
| 2022/0368702 A1* | 11/2022 | Robbins | H04L 63/1416 |
| 2022/0368716 A1* | 11/2022 | Shake | G06N 20/00 |
| 2023/0007483 A1* | 1/2023 | Mueck | H04W 12/069 |
| 2023/0078044 A1* | 3/2023 | Robbins | H04L 63/10 726/23 |

* cited by examiner

MINIMIZING SECURITY SCANNING INDUCED NETWORK DISRUPTIONS

TECHNICAL FIELD

This disclosure relates to minimizing security scanning induced network disruptions.

BACKGROUND

Vulnerability scanning is common practice to verify the security state of network-connected assets such as servers, routers, load balancers, applications, etc. Many compliance regimes (e.g., the Federal Risk and Authorization Management Program (FedRAMP)) require such vulnerability scanning at regular intervals. Some services (hardware and/or software) are known to exhibit unstable behavior when subject to network-based scanning. For example, degraded performance, freezing, crashes, and reboots and other disruptive behavior is common.

SUMMARY

One aspect of the disclosure provides a computer-implemented method that, when executed by data processing hardware causes the data processing hardware to perform operations for minimizing security scanning induced network disruptions. The operations include receiving a scan request requesting to scan a set of network-connected assets. Each network-connected asset in the set of network-connected assets is designated for a network scan and associated with corresponding network characteristics. The operations also include partitioning the set of network-connected assets into a plurality of groups based on the corresponding network characteristics associated with each network-connected asset. Each group includes a different respective subset of network-connected assets of the set of network-connected assets. For each respective group of the plurality of groups, simultaneously, the operations include determining an ordered list for scanning each network-connected asset in the respective subset of network-connected assets partitioned into the respective group, scanning a first network-connected asset of the respective group based on the ordered list, and, after scanning the first network-connected asset, determining a post-scan health status of the first network-connected asset. The operations include determining, using the post-scan health status, that a health of the first network-connected asset is degraded. The operations also include, in response to determining that the health of the first network-connected asset is degraded, halting scanning of further network-connected assets in the respective group.

Implementations of the disclosure may include one or more of the following optional features. In some implementations, the corresponding network characteristics for each network-connected asset includes an amount of isolation between other network-connected assets. Optionally, at least one network-connected asset of the set of network-connected assets includes a server executing one or more applications. In some examples, the operations further include, prior to scanning the first network-connected asset, determining a pre-scan health status of the first network-connected asset.

In some implementations, determining that the health of the first network-connected asset is degraded includes comparing the pre-scan health status with the post-scan health status. The operations may further include, after determining that that health of the first network-connected asset is degraded, determining that a second network-connected asset in a different group than the first network-connected asset shares associated network characteristics with the first network-connected asset and halting scanning of the second network-connected asset in the different group.

In some examples, the operations further include, after halting scanning of further network-connected assets in the respective group, transmitting an alert to an owner of the first network-connected asset. Optionally, the operations further include determining that a threshold number of network-connected assets have degraded health and, in response to determining that the threshold number of network-connected assets have degraded health, halting scanning of all network-connected assets in each group of the plurality of groups. In some examples, the threshold number is equal to ten percent of a total number of network-connected assets in the set of network-connected assets. Determining that the health of the first network-connected asset is degraded may include determining that the first network-connected asset has an unknown health status.

Another aspect of the disclosure provides a system for minimizing security scanning induced network disruptions. The system includes data processing hardware and memory hardware in communication with the data processing hardware. The memory hardware stores instructions that when executed on the data processing hardware cause the data processing hardware to perform operations. The operations include receiving a scan request requesting to scan a set of network-connected assets. Each network-connected asset in the set of network-connected assets is designated for a network scan and associated with corresponding network characteristics. The operations also include partitioning the set of network-connected assets into a plurality of groups based on the corresponding network characteristics associated with each network-connected asset. Each group includes a different respective subset of network-connected assets of the set of network-connected assets. For each respective group of the plurality of groups, simultaneously, the operations include determining an ordered list for scanning each network-connected asset in the respective subset of network-connected assets partitioned into the respective group, scanning a first network-connected asset of the respective group based on the ordered list, and, after scanning the first network-connected asset, determining a post-scan health status of the first network-connected asset. The operations include determining, using the post-scan health status, that a health of the first network-connected asset is degraded. The operations also include, in response to determining that the health of the first network-connected asset is degraded, halting scanning of further network-connected assets in the respective group.

This aspect may include one or more of the following optional features. In some implementations, the corresponding network characteristics for each network-connected asset includes an amount of isolation between other network-connected assets. Optionally, at least one network-connected asset of the set of network-connected assets includes a server executing one or more applications. In some examples, the operations further include, prior to scanning the first network-connected asset, determining a pre-scan health status of the first network-connected asset.

In some implementations, determining that the health of the first network-connected asset is degraded includes comparing the pre-scan health status with the post-scan health status. The operations may further include, after determining that that health of the first network-connected asset is degraded, determining that a second network-connected asset in a different group than the first network-connected asset shares associated network characteristics with the first network-connected asset and halting scanning of the second network-connected asset in the different group.

In some examples, the operations further include, after halting scanning of further network-connected assets in the respective group, transmitting an alert to an owner of the first network-connected asset. Optionally, the operations further include determining that a threshold number of network-connected assets have degraded health and, in response to determining that the threshold number of network-connected assets have degraded health, halting scanning of all network-connected assets in each group of the plurality of groups. In some examples, the threshold number is equal to ten percent of a total number of network-connected assets in the set of network-connected assets. Determining that the health of the first network-connected asset is degraded may include determining that the first network-connected asset has an unknown health status.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
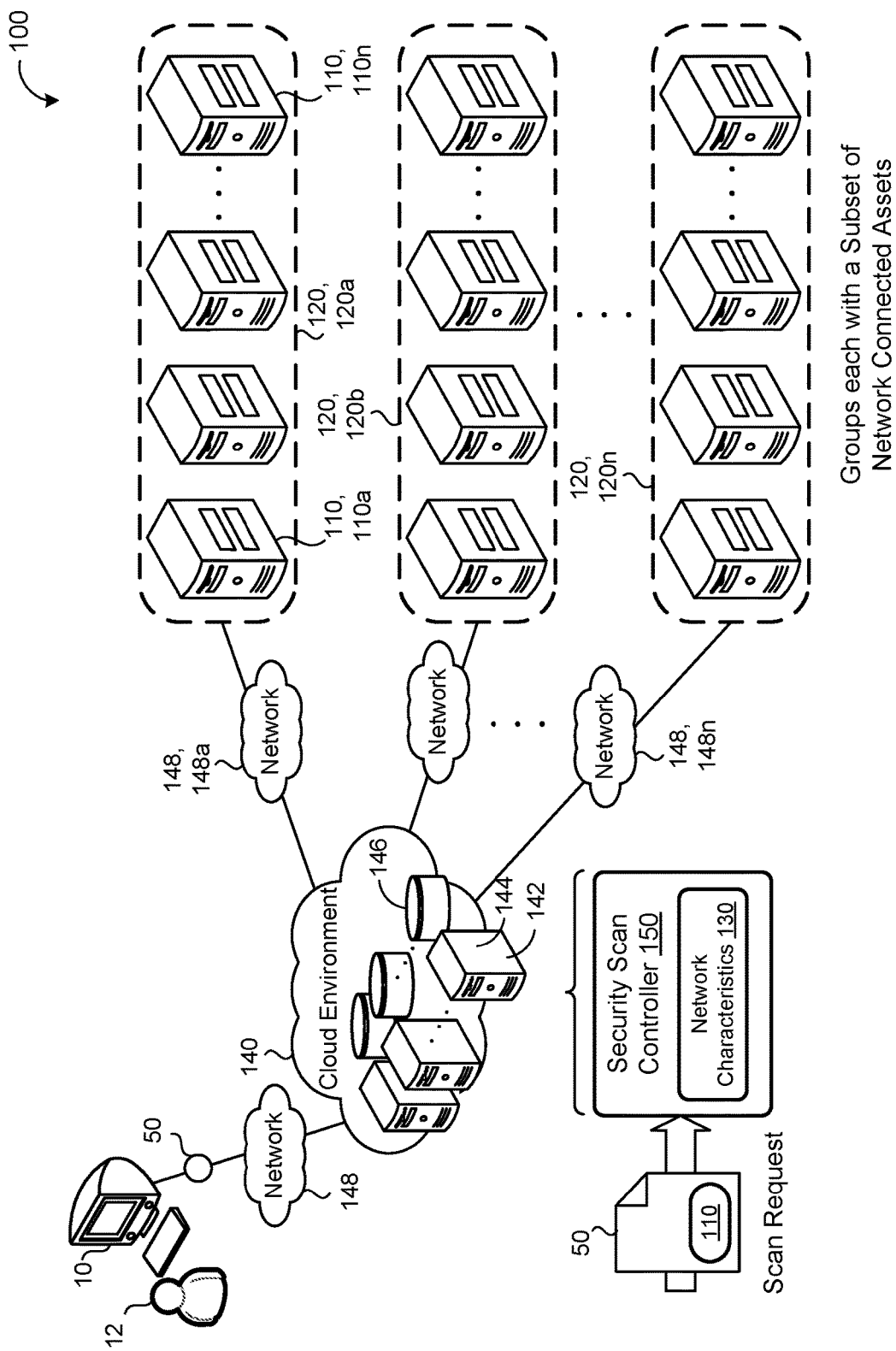
FIG. 1 is a schematic view of an example system for minimizing security scanning induced network disruptions.

Black box vulnerability scanning is a common practice to verify the security state of network-connected assets such as servers, routers, load balancers, applications, etc. Many compliance regimes (e.g., the Federal Risk and Authorization Management Program (FedRAMP)) require such vulnerability scanning at regular intervals. Some services (hardware and/or software) are known to exhibit unstable behavior when subject to network-based scanning. For example, degraded performance, freezing, crashes, and reboots and other disruptive behavior is common. This can be particularly disruptive when a scanner, for example, covers a range of Internet Protocol (IP) addresses or multiple replicas of the same application, as this can quickly bring down all instances of a cluster and/or replica pool and generate outages even when appropriate redundancy has been deployed. For at least these reasons, performing security scans on production assets is a challenge that often must balance security and stability of the network. The difficulty is often further increased by compliance regimes that mandate scanning of production infrastructure instead of test instances.

Typically, these challenges are met with a combination of two approaches: sampling and off-peak scheduling. With sampling, generally a small subset of assets are randomly selected for scanning. More advanced sampling (e.g., based on various types of classifications such as per model, maker, etc.) can also be deployed to the same effect. However, such sampling suffers from two primary shortcomings. First, sampling provides a much weaker indication of the security state of the network because building a representative sample of the network is a difficult and, the effectiveness of the sample relies on individual assets not deviating from a common set of configurations. Second, sampling does not actually provide a strong stability guarantee, as random sampling may select all devices responsible for delivering a given service, handling a major network link, etc.

The common alternative to sampling includes off-peak scheduling, which simply involves executing scans when production traffic is comparatively lower such that an outage can be more readily tolerated. For example, scans may be scheduled during weekends. However, most modern large enterprises no longer have any window of tolerance for downtime, weekend or not, so this option is rarely still viable.

Implementations herein are directed toward a system for minimizing security scan induced network disruptions. The system includes a security scan controller that orchestrates or schedules execution of security scans on a set of network-connected assets. The security scan controller directs the scanning for each network-connected asset based on the schedule. After completing a scan on any network-connected asset, the security scan controller directs a health checker to determine whether a health of the network-connected asset is degraded. When the health of the network-connected asset is not degraded, the security scan controller proceeds with scanning the next network-connected asset. However, when the health of the network-connected asset is degraded, the security scan controller halts further scanning and may generate an alert or notification to one or more owners or operators of the network-connected assets.

Referring to FIG. 1, in some implementations, an example system 100 includes a computing system 140. The computing system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The computing system 140 includes or is in communication with multiple network-connected assets 110, 110a—n. Each network-connected asset 110 may include computing resources and memory resources The network-connected assets 110 may be any physical network device (e.g., a router, load balancer, switch, a server, etc.), a virtualized instance (e.g., a virtual machine), or a single replica of a software application executing on a computing device (e.g., a server).

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The computing system 140 is in communication with the network-connected assets 110 via one or more networks 148, 148a—n. These networks 148 may be any combination of public and private networks. In some examples, some or all of the network-connected assets 110 may be part of a distributed computing system of the computing system 140.

Each network-connected asset 110 is associated with network characteristics 130. The network characteristics 130 may define an impact the respective network-connected asset 110 may have on other network-connected assets 110. In some examples, the network characteristics 130 include information regarding an amount of isolation between the respective network-connected asset 110 and other network-connected assets 110. For example, network characteristics 130 for a respective network-connected asset 110 indicates that it is isolated from another network-connected asset 110 (e.g., on a separate network 148) and thus, a failure of the respective network-connected asset 110 will not have any impact on the other network-connected asset 110. In another example, network characteristics 130 for a respective network-connected asset 110 (e.g., a load-balancer) indicates that a failure or disruption to the respective network-connected asset 110 will have a significant impact on another network-connected asset 110 (e.g., a server downstream from the load-balancer).

The computing system 140 executes a security scan controller 150. The security scan controller 150 receives or obtains a scan request 50 requesting a scan (e.g., a security scan and/or a vulnerability scan) of a set of the network-connected assets 110. In some examples, the scan includes an intrusive vulnerability scan. The security scan controller 150 may receive the scan request from a user 12 (via a user device 10 through a network 148) associated with one or more of the network-connected assets 110. The user device 10 may correspond to any computing device, such as a desktop workstation, a laptop workstation, or a mobile device (i.e., a smart phone).

In some examples, the security scan controller 150 partitions the set of network-connected assets 110 into a plurality of groups 120, 120a—n based on the corresponding network characteristics 130. Each group 120 includes a different respective subset of the network-connected assets 110. That is, each network-connected asset 110 is partitioned into only a single group 120 based on the respective network characteristics 130.

In some implementations, the security scan controller 150 partitions the groups 120 based on the impact a disruption the network-connected asset 110 may have on other network-connected assets 110. Specifically, the security scan controller 150 may partition the network-connected assets 110 such that a disruption of a network-connected asset 110 caused by a scan can only substantially affect other network-connected assets 110 in the same group 120. That is, in some examples, the groups 120 may define isolation boundaries among the network-connected assets 110 such that a health failure in a network-connected asset 110 of one group will have minimal effects on network-connected assets 110 of other groups. For example, the security scan controller 150 may partition network-connected assets 110 on separate physical networks 148 into separate groups 120. In this way, the groups 120 may delineate the "blast radius" a security scan disruption may affect.

Figure 2A:
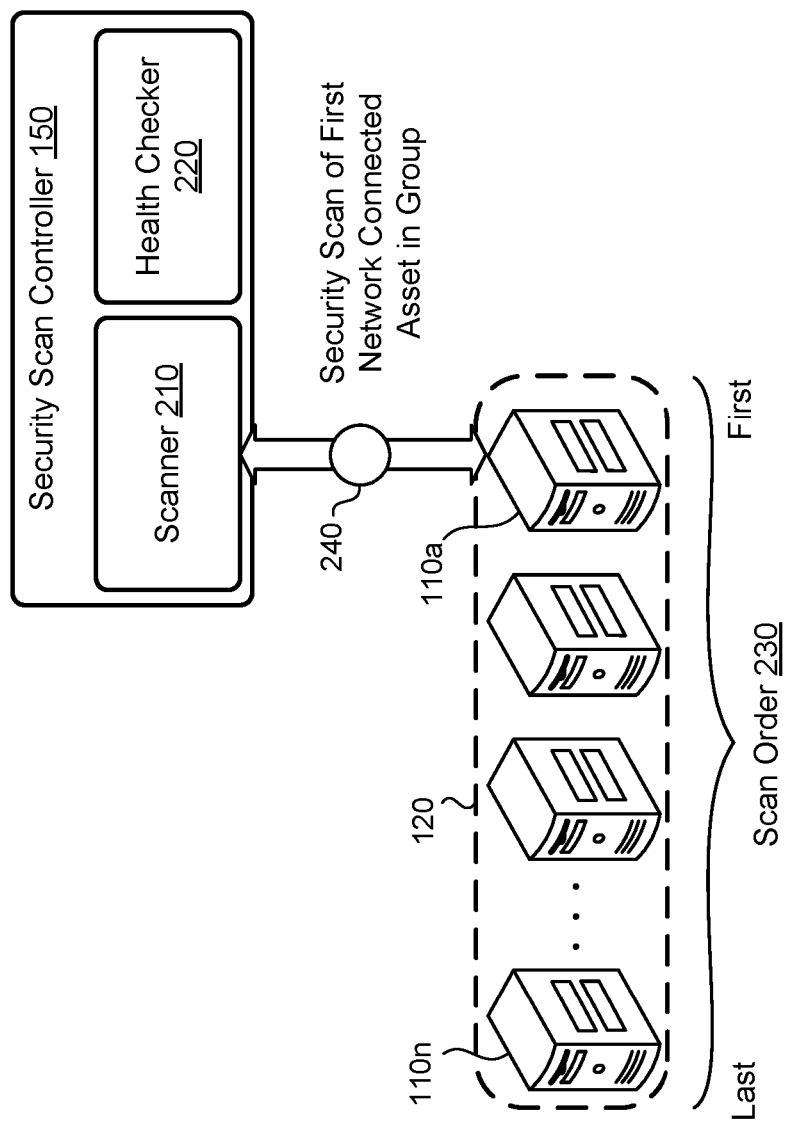
FIGS. 2A-2D are schematic views of exemplary components of the system of FIG. 1.

Referring now to FIG. 2A, a schematic view 200a shows the security scan controller 150 including a scanner 210 and a health checker 220. The security scan controller 150, for each group 120, determines an ordered list 230 (e.g., a scan order) for scanning each network-connected asset 110 in the respective group 120. The scanner 210 initiates a security scan of a first network-connected asset 110a of the group 120 based on the ordered list 230. The scanner 210 may be part of the security scan controller 150 (i.e., executing on the computing system 140) or may be executed by a third party at the command and/or control of the security scan controller 150. The scanner 210 may invoke any conventional and well known scanning techniques to perform security and/or vulnerability scanning of the network-connected assets 110. The scan returns scan results 240 that include any details relevant to the scan and the scanned network-connected asset 110.

Figure 2B:
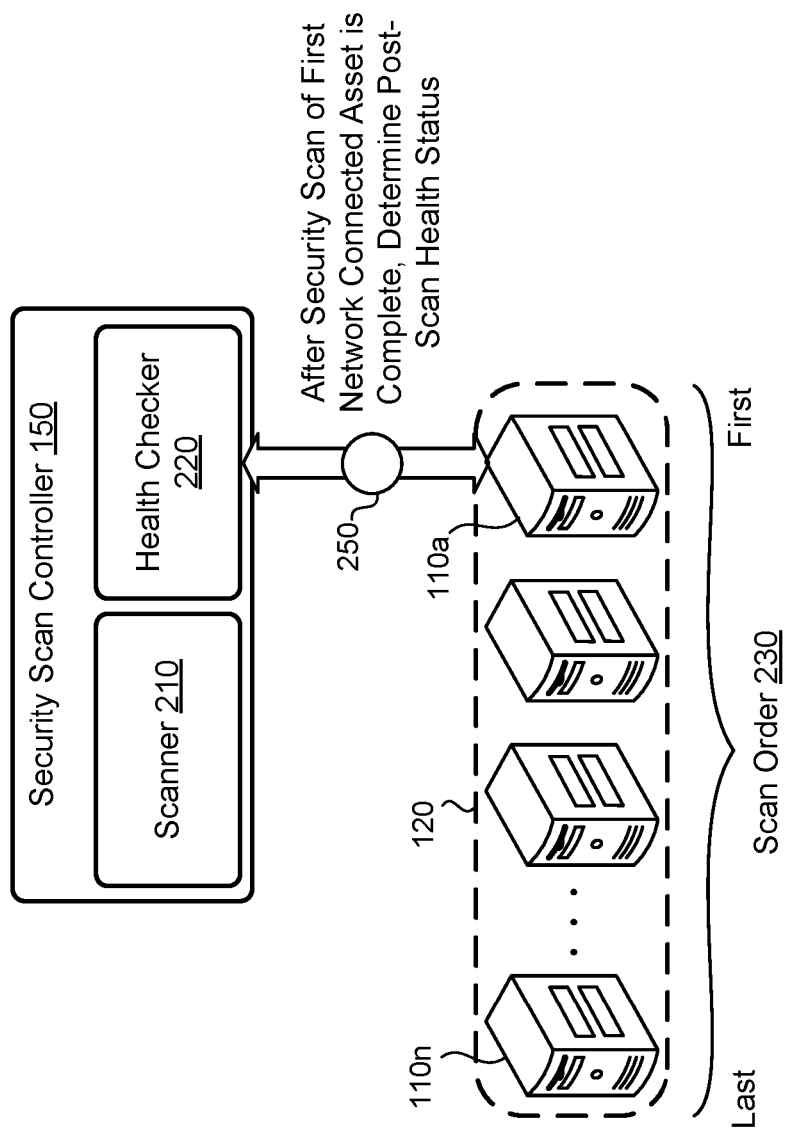

Referring now to FIG. 2B, as shown in a schematic view 200b, after scanning the first network-connected asset 110a, the health checker 220 determines a post-scan health status 250 of the first network-connected asset 110a. The health checker 220, like the scanner 210, may be a part of the security scan controller 150 and computing system 140 or may be executed by a third party at the command and/or control of the security scan controller 150. The health checker 220 queries the first network-connected asset 110a to retrieve the post-scan health status 250. The post-scan health status 250 indicates a health of the first network-connected asset 110a subsequent to the scan. The health checker 220 may use any conventional means to retrieve the health status 250 of the first network-connected asset 110a. For example, the health checker 220 may access or request diagnostic data from the first network-connected asset 110a. Alternatively or additionally, the health checker 220 may issue one or more commands to the first network-connected asset 110a and determine whether the network-connected asset's response indicates nominal or degraded health.

The security scan controller 150 determines, using the post-scan health status 250, whether the health of the first network-connected asset 110a is degraded. As used herein, degraded health indicates that the network-connected asset 110 is unable to perform functions normally. Degraded health may include a crash, freeze, reboot, delayed response, or intermittent behavior. In some examples, the security scan controller 150 determines that the health of a network-connected asset 110 is degraded when the post-scan health status 250 indicates an unknown health.

Figure 2C:
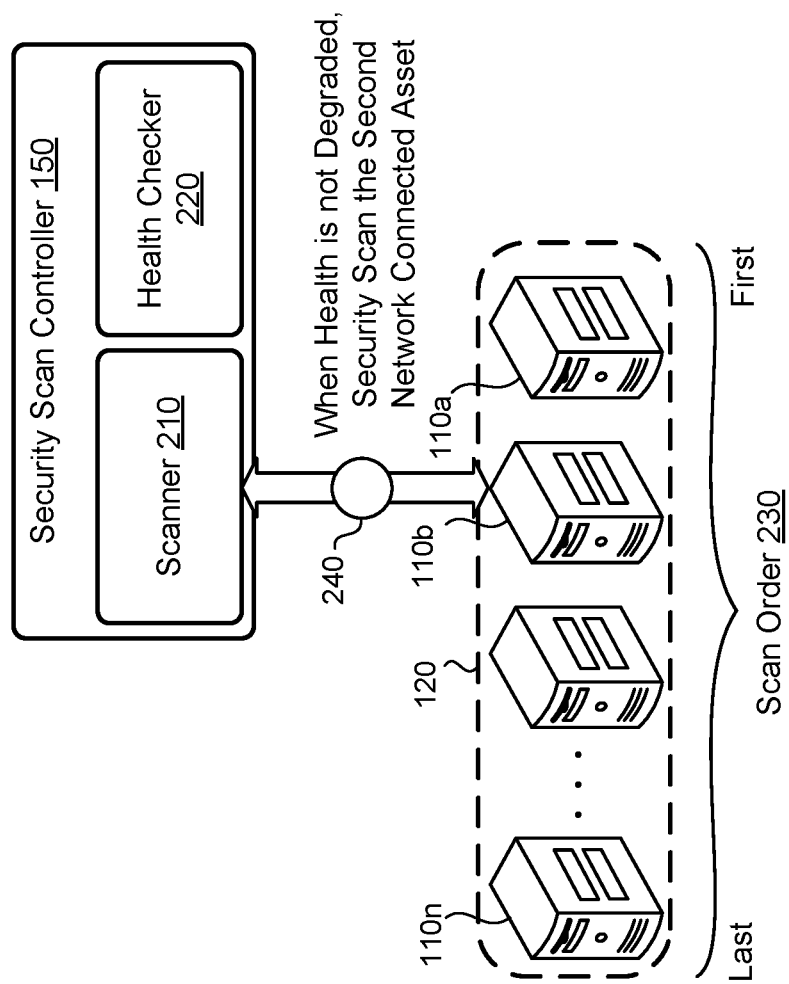

Referring now to FIG. 2C, as shown in schematic view 200c, when the post-scan health status 250 indicates that the health of the first network-connected asset is not degraded, the scanner 210 scans a second network-connected asset 110b. After the scan is complete, the health checker 220 determines the post-scan health status 250 of the second network-connected asset 110b (not shown). The security scan controller 150 will continue to scan the network-connected assets 110 in the group 120 one at a time as long as the post-scan health statuses 250 continue to show that the health of the scanned network-connected assets 110 has not degraded.

Figure 2D:
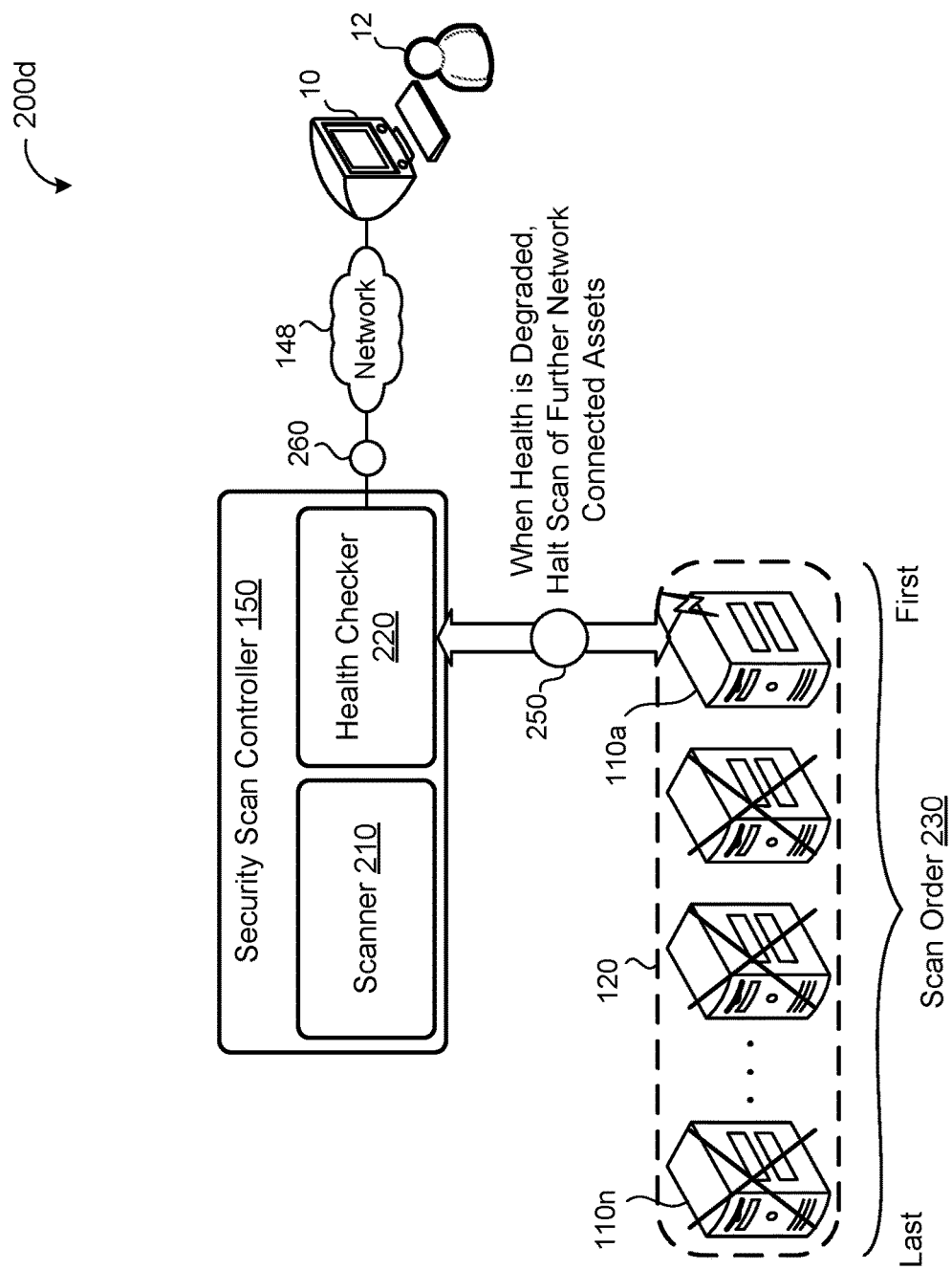

Referring now to FIG. 2D, as shown in schematic view 200d, when the security scan controller 150 determines, using the post-scan health status 250, that the health of the first network-connected asset 110a is degraded, the security scan controller 150 halts scanning of further network-connected assets 110 in the group 120. In some implementations, the security scan controller 150, upon halting the scanning, transmits a notification 260 to the user device 10 (e.g., via the network 148) associated with the user 12. The notification 260 may take any form (e.g., an email, a text message, a push notification, etc.) and may include information identifying the network-connected asset 110 with degraded health. In some examples, the user 12 (via the user device 10) responds with a request to continue scanning, upon which the security scan controller 150 may continue scanning the remaining network-connected assets 110 in the group 120.

In some implementations, the security scan controller 150 determines that a threshold number of network-connected assets 110 have degraded health from one or more groups 120 and, in response to determining that the threshold number of network-connected assets 110 have degraded health, halting scanning of all network-connected assets 110 in each group 120. That is, in these implementations, the security scan controller 150 may halt all scanning of all network-connected assets 110 across all groups 120 when a total number of degraded network-connected assets 110 satisfies the threshold number. For example, the threshold number is equal to ten percent of a total number of all the network-connected assets 110. The threshold number may be configurable (e.g., by the user 12). In some implementations, the threshold is over a threshold time period (i.e., a threshold number of network-connected assets 110 within a threshold period of time such as one hour). The security scan controller 150 may transmit a configurable notification 260 to the user 12 when the threshold is satisfied. The user 12 may respond with a request or command to continue scanning.

In some implementations, the security scan controller 150, using the health checker 220, determines a pre-scan health status (i.e., an initial health) of each network-connected asset 110 prior to scanning the respective network-connected asset 110. In these implementations, the security scan controller 150 may determine whether the health of a scanned network-connected asset 110 is degraded by comparing the pre-scan health status and the post-scan health status 250. For example, a difference between the pre-scan health status and the post-scan health status may indicate that the health of the network-connected asset 110 has degraded as a result of the scan. The security scan controller 150 may disregard (or not provide as much weight to) a post-scan health status 250 that indicates that the health of a network-connected asset 110 is degraded when the pre-scan health status also indicated that the health of the network-connected asset 110 is degraded. In some implementations, the security scan controller 150 skips scanning of network-connected assets 110 that have degraded health prior to scanning.

In some examples, the security scan controller 150 performs an impact assessment to determine an impact the security scan had on the health of the network-connected asset 110. The impact assessment may include the pre-scan health status, the post-scan health status 250, and/or results from previous scans. The security scan controller 150 may perform additional health checks at regular or irregular intervals to continue to monitor the health of the network-connected asset 110 and to update and/or maintain the impact assessment.

Referring back to FIG. 1, the security scan controller 150 may scan one network-connected asset 110 from each group simultaneously. That is, because the security scan controller 150 may partition the network-connected assets 110 such that a disruption in one network-connected asset 110 does not significantly impact network-connected assets 110 in other groups 120, the security scan controller 150 may increase throughput by scanning a network-connected asset 110 from each group 120 simultaneously. In this way, the security scan controller 150 may balance throughput when partitioning the network-connected assets 110 into groups 120. For example, a larger number of groups 120 increases throughput as the security scan controller 150 may scan a larger number of network-connected assets 110 in parallel.

In some examples, the security scan controller 150 may tradeoff throughput and reliability by including additional parallel scans within the same group 120. For example, the security scan controller 150 may scan two or more network-connected assets 110 simultaneously within the same group at the expense of some reliability, as parallel failures may lead to multiple failures before scanning can be halted. The number of parallel scans may be configured by the user 12 of the network-connected assets 110 or may be determined based on a criticality or sensitivity of the network-connected assets 110. For instance, when the network-connected assets 110 provide services that are not critical, the number of parallel scans may be increased.

Figure 3:
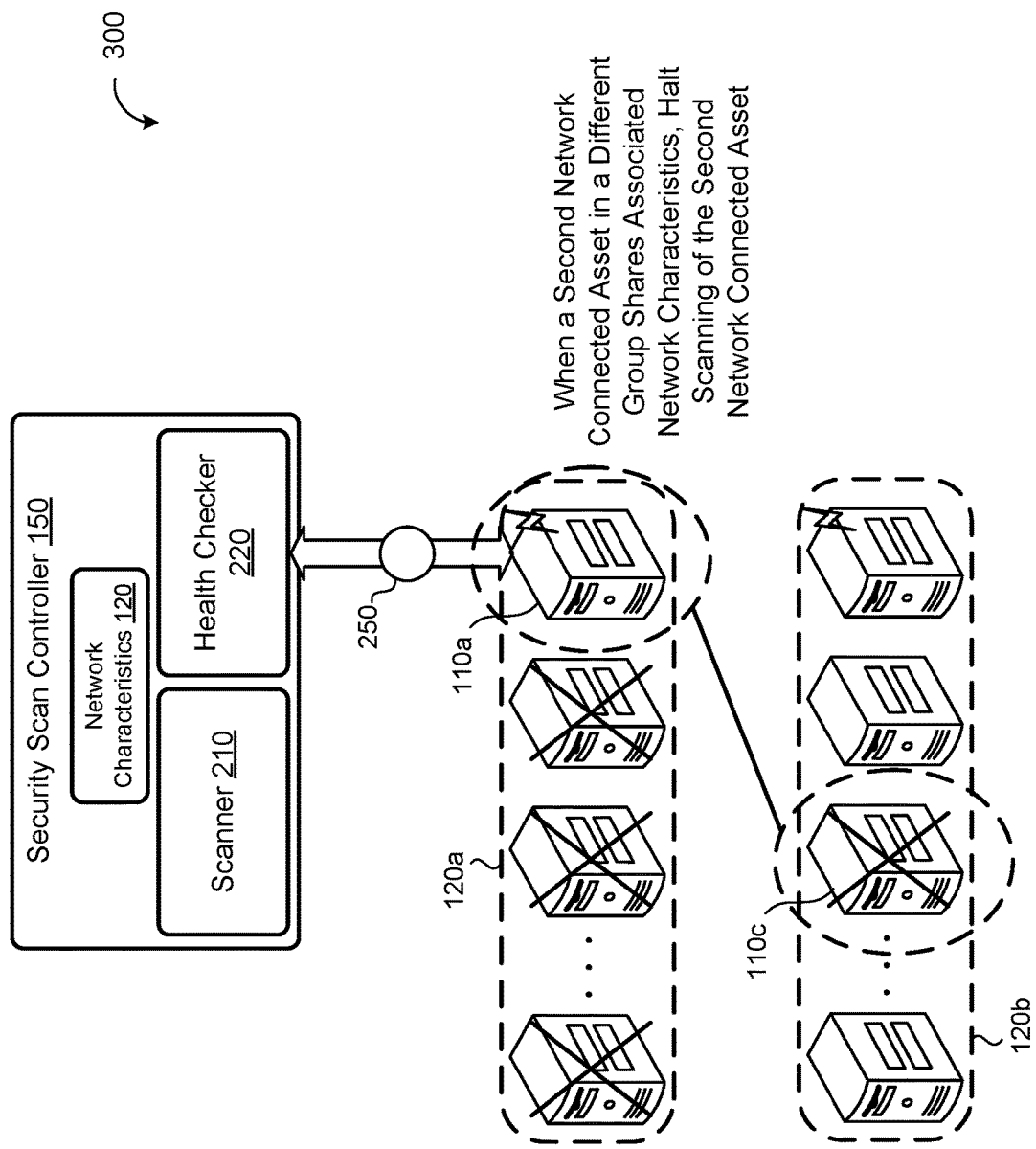
FIG. 3 is a schematic view of comparing network-connected assets in different groups.

Referring now to FIG. 3, a schematic view 300 includes a first group 120a of network-connected assets 110 and a second group 120b of different network-connected assets 110. In some implementations, after determining that the health of a network-connected asset 110 is degraded after a scan (using the post-scan health status 250), the security scan controller 150 determines that a second network-connected asset 110c shares associated network characteristics 130 with the first network-connected asset 110. Based on this sharing of network characteristics 130, the security scan controller 150 may halt scanning of the second network-connected asset 110c in the second group 120b. That is, in some examples, the security scan controller 150 may halt scanning of one or more network-connected assets 110 in one or more groups 120 based on degraded health of a scanned network-connected asset 110 in a different group 120. For example, a specific brand and version of a network-connected asset 110 (e.g., a load balancer) exhibits degraded health after scanning. There may be a reasonable chance that other network-connected assets 110 that are the same or similar type (e.g., model, software, version, revision, etc.) as the degraded network-connected asset 110 (e.g., other similar load balancers in other groups) may also experience health degradation when scanned. The security scan controller 150 may use the network characteristics 130 to find the matching network-connected assets 110 and remove them from the ordered list 230. The security scan controller 150 may not halt scanning of the other groups 120 entirely, but instead only prohibit the matching network-connected assets 110 from being scanned.

Thus, the system may effectively and simply perform security scans on networks of network-connected assets even when there is a high churn of devices and/or expected disruption. Importantly, the system minimizes the probability of actual production failure by introducing an automated failsafe by partitioning the groups in a manner that maximizes throughput while minimizing the blast radius of network disruptions.

Figure 4:
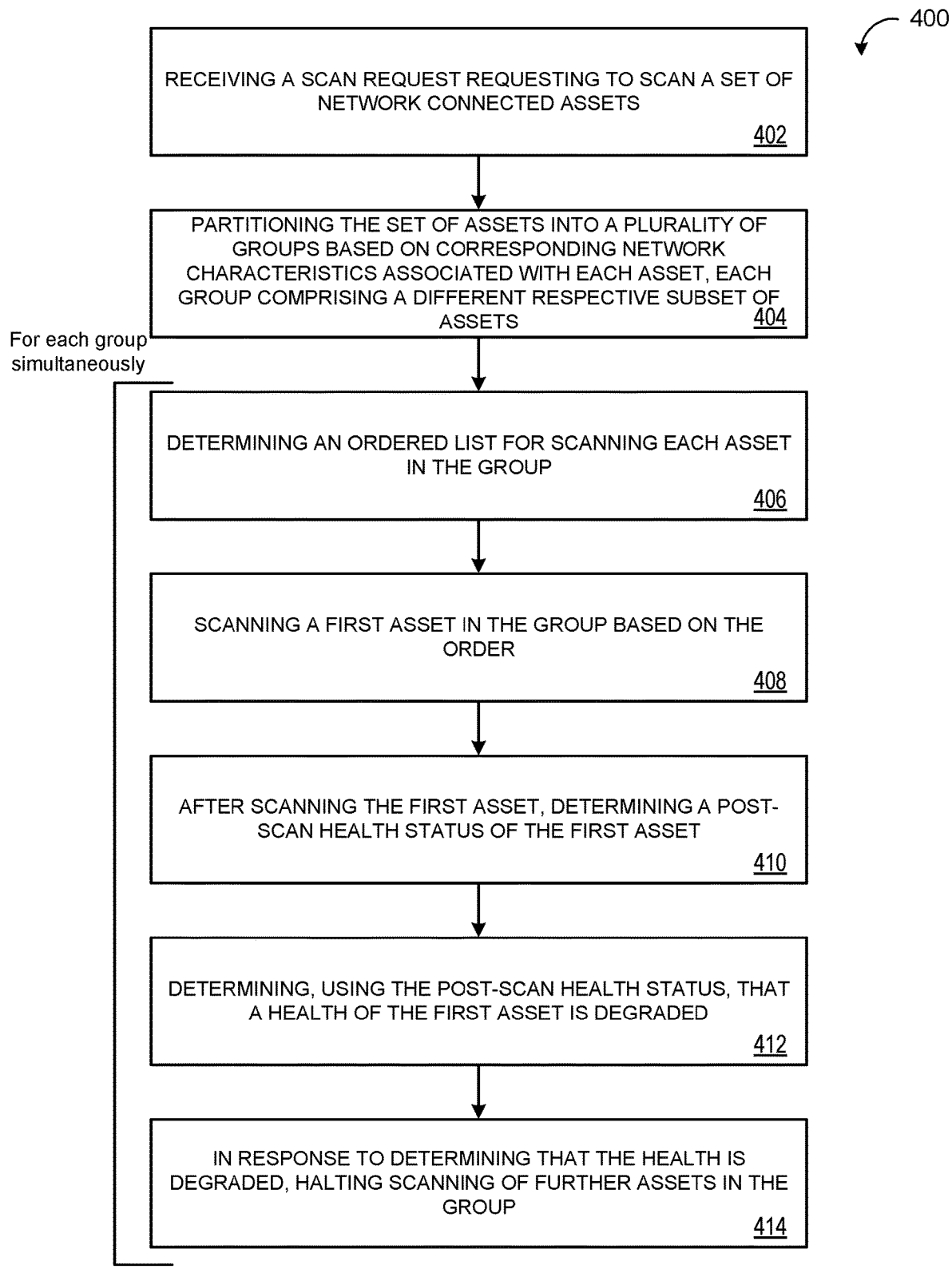
FIG. 4 is a flowchart of an example arrangement of operations for a method of minimizing security scanning network disruptions.

FIG. 4 is a flowchart of an exemplary arrangement of operations for a method 400 of minimizing security scan disruptions of network-connected assets. The method 400 includes, at operation 402, receiving a scan request 50 requesting to scan a set of network-connected assets 110. Each network-connected asset 110 in the set of network-connected assets 110 is designated for a network scan and associated with corresponding network characteristics 130. At operation 404, the method 400 includes partitioning the set of network-connected assets 110 into a plurality of groups 120 based on the corresponding network characteristics 130 associated with each network-connected asset. Each group 120 includes a different respective subset of network-connected assets 110 of the set of network-connected assets 110. The method 400, at operation 406, includes, for each group 120 of the plurality of groups 120 simultaneously, determining an ordered list 230 for scanning each network-connected asset 110 in the respective subset of network-connected assets 110 partitioned into the group 120.

At operation 408, the method 400 includes, for each group 120 simultaneously, scanning a first network-connected asset 110 of the group 120 based on the ordered list 230. After scanning the first network-connected asset 110, the method 400 includes, at operation 410, determining a post-scan health status 250 of the first network-connected asset 110. The method 400 includes, at operation 412, determining, using the post-scan health status 250, that a health of the first network-connected asset 110 is degraded. In response to determining that the health of the first network-connected asset 110 is degraded, the method 400 includes, at operation 414, halting scanning of further network-connected assets 110 in the group 120.

Figure 5:
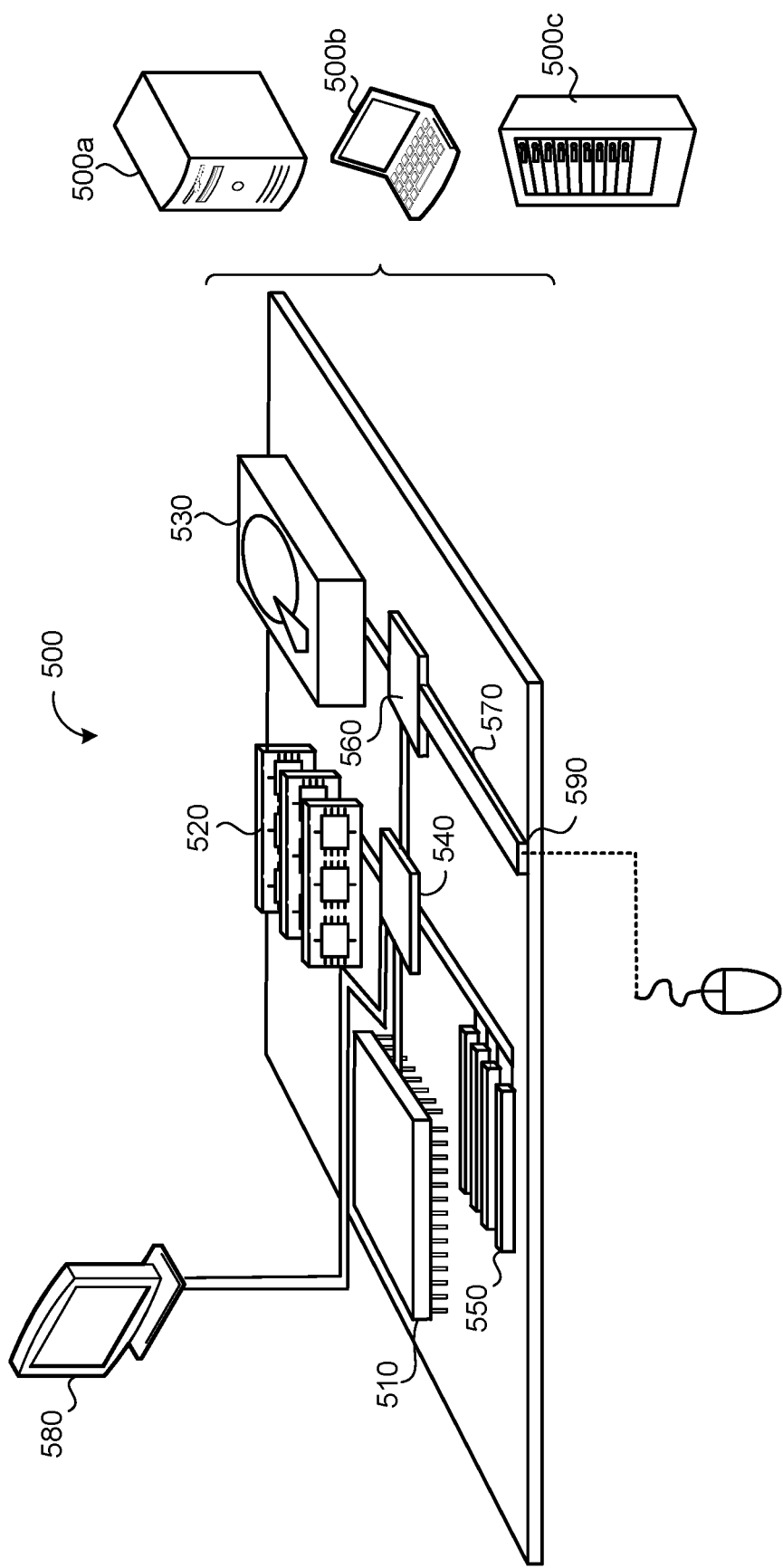
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a scan request requesting to scan a set of network-connected assets, each network-connected asset in the set of network-connected assets designated for a network scan and associated with corresponding network characteristics;
   partitioning the set of network-connected assets into a plurality of groups based on the corresponding network characteristics associated with each network-connected asset, each group comprising a different respective subset of network-connected assets of the set of network-connected assets; and
   for each respective group of the plurality of groups, simultaneously:
   determining an ordered list for scanning each network-connected asset in the respective subset of network-connected assets partitioned into the respective group;
   scanning a first network-connected asset of the respective group based on the ordered list;
   after scanning the first network-connected asset, determining a post-scan health status of the first network-connected asset;
   determining, using the post-scan health status, that a health of the first network-connected asset is degraded; and
   in response to determining that the health of the first network-connected asset is degraded, halting scanning of further network-connected assets in the respective group.

2. The method of claim 1, wherein the corresponding network characteristics for each network-connected asset comprises an amount of isolation between other network-connected assets.

3. The method of claim 1, wherein at least one network-connected asset of the set of network-connected assets comprises a server executing one or more applications.

4. The method of claim 1, wherein the operations further comprises, prior to scanning the first network-connected asset, determining a pre-scan health status of the first network-connected asset.

5. The method of claim 4, wherein determining that the health of the first network-connected asset is degraded comprises comparing the pre-scan health status with the post-scan health status.

6. The method of claim 1, wherein the operations further comprise, after determining that that health of the first network-connected asset is degraded:
   determining that a second network-connected asset in a different group than the first network-connected asset shares associated network characteristics with the first network-connected asset; and
   halting scanning of the second network-connected asset in the different group.

7. The method of claim 1, wherein the operations further comprise, after halting scanning of further network-connected assets in the respective group, transmitting an alert to an owner of the first network-connected asset.

8. The method of claim 1, wherein the operations further comprise:
   determining that a threshold number of network-connected assets have degraded health; and
   in response to determining that the threshold number of network-connected assets have degraded health, halting scanning of all network-connected assets in each group of the plurality of groups.

9. The method of claim 8, wherein the threshold number is equal to ten percent of a total number of network-connected assets in the set of network-connected assets.

10. The method of claim 1, wherein determining that the health of the first network-connected asset is degraded comprises determining that the first network-connected asset has an unknown health status.

11. A system comprising:
    data processing hardware; and
    memory hardware in communication with the data processing hardware, the memory hardware storing instructions that when executed on the data processing hardware cause the data processing hardware to perform operations comprising:
- receiving a scan request requesting to scan a set of network-connected assets, each network-connected asset in the set of network-connected assets designated for a network scan and associated with corresponding network characteristics;
- partitioning the set of network-connected assets into a plurality of groups based on the corresponding network characteristics associated with each network-connected asset, each group comprising a different respective subset of network-connected assets of the set of network-connected assets; and
- for each respective group of the plurality of groups, simultaneously:
  - determining an ordered list for scanning each network-connected asset in the respective subset of network-connected assets partitioned into the respective group;
  - scanning a first network-connected asset of the respective group based on the ordered list;
  - after scanning the first network-connected asset, determining a post-scan health status of the first network-connected asset;
  - determining, using the post-scan health status, that a health of the first network-connected asset is degraded; and
  - in response to determining that the health of the first network-connected asset is degraded, halting scanning of further network-connected assets in the respective group.

12. The system of claim 11, wherein the corresponding network characteristics for each network-connected asset comprises an amount of isolation between other network-connected assets.

13. The system of claim 11, wherein at least one network-connected asset of the set of network-connected assets comprises a server executing one or more applications.

14. The system of claim 11, wherein the operations further comprises, prior to scanning the first network-connected asset, determining a pre-scan health status of the first network-connected asset.

15. The system of claim 14, wherein determining that the health of the first network-connected asset is degraded comprises comparing the pre-scan health status with the post-scan health status.

16. The system of claim 11, wherein the operations further comprise, after determining that that health of the first network-connected asset is degraded:
- determining that a second network-connected asset in a different group than the first network-connected asset shares associated network characteristics with the first network-connected asset; and
- halting scanning of the second network-connected asset in the different group.

17. The system of claim 11, wherein the operations further comprise, after halting scanning of further network-connected assets in the respective group, transmitting an alert to an owner of the first network-connected asset.

18. The system of claim 11, wherein the operations further comprise:
- determining that a threshold number of network-connected assets have degraded health; and
- in response to determining that the threshold number of network-connected assets have degraded health, halting scanning of all network-connected assets in each group of the plurality of groups.

19. The system of claim 18, wherein the threshold number is equal to ten percent of a total number of network-connected assets in the set of network-connected assets.

20. The system of claim 11, wherein determining that the health of the first network-connected asset is degraded comprises determining that the first network-connected asset has an unknown health status.

* * * * *